United States Patent [19]
Ritter, Jr.

[11] 3,775,087
[45] Nov. 27, 1973

[54] APPARATUS FOR CONVEYING AND HEAT TREATING HOT GLASS WITH A ROLLER CONVEYOR

[75] Inventor: George F. Ritter, Jr., Toledo, Ohio

[73] Assignee: Libbey-Owens-Ford Company, Toledo, Ohio

[22] Filed: Mar. 6, 1972

[21] Appl. No.: 231,978

[52] U.S. Cl. .................... 65/348, 65/374, 29/130, 29/132
[51] Int. Cl. ............................................ C03b 27/00
[58] Field of Search .................... 65/104, 114, 118, 65/119, 374, 351, 350, 349, 348; 29/132, 130

[56] References Cited
UNITED STATES PATENTS
3,140,164  7/1964  Long ................................. 65/374 X
3,573,022  3/1968  Frank ................................. 65/104
1,452,824  4/1923  Bosworth ......................... 29/130 X Primary Examiner—Arthur D. Kellogg
Attorney—Elmer L. Collins et al.

[57] ABSTRACT

Tubular conveyor rolls, in the chilling section of a sheet glass tempering apparatus, that are provided with braided sleeve coverings and have their hollow interiors partially filled with lead shot to dampen unwanted vibrations.

6 Claims, 4 Drawing Figures

PATENTED NOV 27 1973  3,775,087

APPARATUS FOR CONVEYING AND HEAT TREATING HOT GLASS WITH A ROLLER CONVEYOR

BACKGROUND OF THE INVENTION

1. Field of the Invention

The present invention relates generally to the tempering of glass sheets, and is particularly concerned with improvements in the supporting and conveying of thin glass sheets during at least one phase of the tempering treatment.

2. Description of the Prior Art

The tempering of both flat and bent sheets of glass in standard thicknesses (¼ inch and up) is of course old and well known. Indeed it has become conventional practice to commercially temper such sheets to acceptable standards of strength and breaking characteristics, and among the contributing factors to this successful commercial production are a technique known as IG (inertia and gravity) bending, covered in U.S. Pat. No. 3,476,540, and the use of conveyor rolls with expansible and contractible braided sleeves, which is covered in U.S. Pat. No. 3,315,774.

However there has recently been developing in the art a rapidly expanding demand for very thin (0.160 inch thicknesses and below) tempered glass sheets for automotive use. Every effort is being made to meed this demand, but it has become evident that previously known tempering procedures do not always lend themselves acceptably to tempering the thinner glass. In fact, the tempering thereof has presented a number of new problems, among which is the problem of satisfactorily supporting and conveying the thin glass sheets, often at increased speeds, during and between the heating and chilling phases of the tempering procedure.

SUMMARY OF THE INVENTION

The present invention is based on applicant's discovery that objectionable vibrations that are set up in small diameter conveyor rolls that are employed, for example, in the chilling area of a thin glass tempering apparatus can be minimized, if not entirely eliminated, by the use of tubular type rolls and by the incorporation of vibration dampening substances into the hollow interiors thereof.

Accordingly it is a primary object of the invention to reduce glass breakage and injury to glass tempering equipment by introducing vibration dampening means into hollow rolls that are used to convey glass sheets through a tempering apparatus.

Another object is to provide tubular rolls that have their hollow interiors charged with a vibration dampening substance for use as conveyor rolls in sheet glass tempering apparatus.

Still another object is the provision for such use of a hollow roll, covered with a braided sleeve of heat and wear resistant material, and carrying a supply of vibration dampening particles inside.

Further objects and advantages will become apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENT

Figure 1:
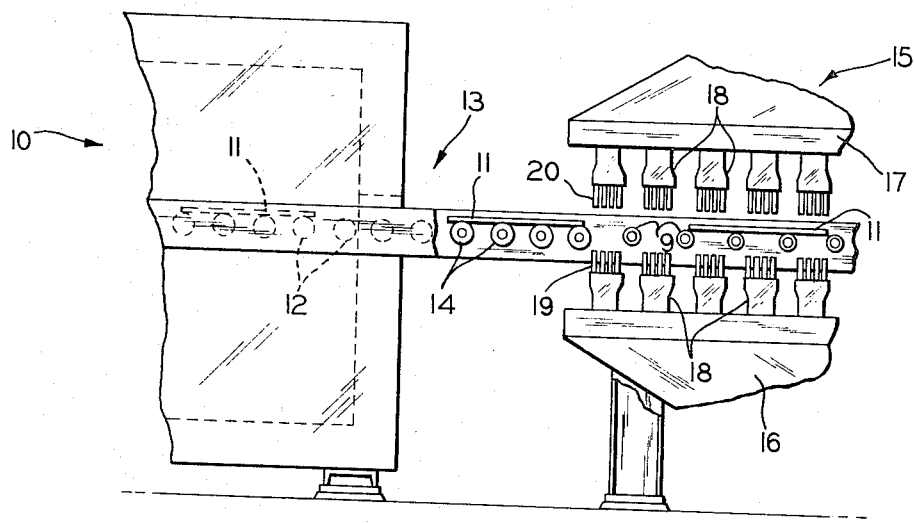
FIG. 1 is a longitudinal, side elevational view illustrating the exit end of the heating area and the entrance end of the chilling area of a sheet glass tempering apparatus.

FIG. 1 illustrates a preferred form of the conveyor roll of the invention incorporated, as at 9, into a conventional form of flat glass tempering apparatus which includes a heating furnace 10, through which flat glass sheets 11 are conveyed on rolls 12 from the entrance end (not shown) to the discharge end 13. The temperature of the furnace 10 is so regulated that, upon reaching the discharge end, a sheet will have been heated to approximately the softening point of the glass and, thereafter, it is carried rapidly forward on intermediate rolls 14 toward and into the chilling area 15. The chilling area is provided with a pair of, i.e., above and below, blast heads 16 and 17, disposed on opposite sides of the path of travel of the sheets 11 and provided with projecting sections 18 carrying upwardly and downwardly directed tubes 19 and 20 respectively through which chilling air from the blast heads 16 and 17 is directed toward opposite faces of glass sheets 11 as they are carried therebetween on the chilling area conveyor rolls 9.

To simplify the conventional part of the illustration, the structure of FIG. 1 has been shown as supplying flat glass sheets only to the chilling area 15. However it is to be understood that a suitable, quick acting, IG or pressure bending apparatus could be interposed between the furnace 10 and the chilling area 15, in which case heated glass sheets from the furnace would pass through and be bent in this interposed bending apparatus and the bent sheets then fed, while still hot, into the chilling section.

In any event, regardless of whether flat or bent, hot glass sheets 11 are received in the chilling section 15 and are carried therethrough on rolls 9. These are of relatively small diameter to permit mounting of the discharge ends of both the upper and lower blast head tubes 19 and 20 in close proximity to and preferably equidistant from the path of travel of the sheets 11 through the chilling area.

Heretofore conveyor rolls in tempering apparatus of this general type, and particularly the small diameter solid or tubular steel rolls used in the tempering sections, developed vibrations in tune with their natural frequency. This frequency was fast enough (between 15 and 30 cycles per second) to appear as a blur. Moreover the amplitude built up sufficiently to cause breakage of glass moving through the chilling section and sometimes was great enough to tear the roll covering, when present, and even to damage other parts of the apparatus.

Figure 2:
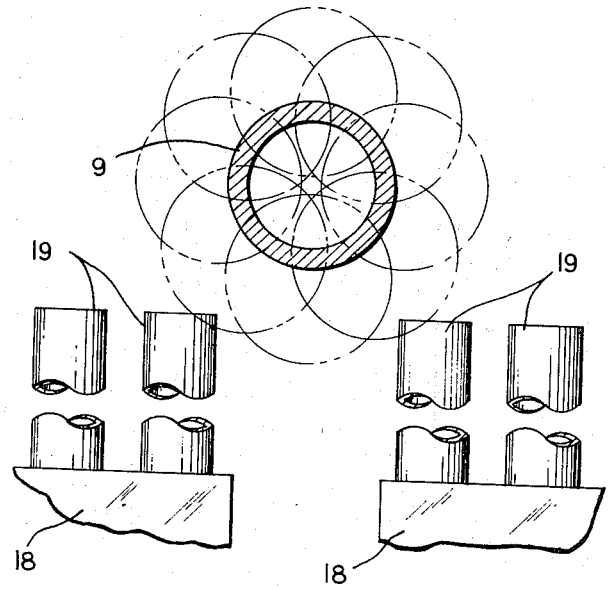
FIG. 2 is a sectional view schematically illustrating the circular amplitude that the center of a hollow cylindrical roll may take during rotation with relation particularly to the air tubes on adjacent sections of the lower blast head of the apparatus of FIG. 1.

Thus the roll 9, shown in FIG. 2 without the vibration dampening means of the invention, although located somewhat closely above the tops of the lower blast head tubes 19, is positioned in the space between tubes of adjacent sections 18 where it would presumably be most likely to avoid contact therewith. Nevertheless, as depicted in broken lines, the circular amplitude that the center of a roll of this character will take, at high speeds of around 300 R.P.M., at lower speeds of around 100 R.P.M. and even when stopped, is considerable.

More importantly it is great enough in actual practice to break thin glass sheets being tempered, and to result in sufficiently sharp contact between the rolls and the blast head tubes to tear fibrous coverings on the rolls and/or to bend or break the tubes.

However, this problem is successfully overcome in accordance with the invention by incorporating a motion dampening substance into the hollow of the roll to dampen the objectionable vibration by interferring with its natural frequency.

Figure 3:
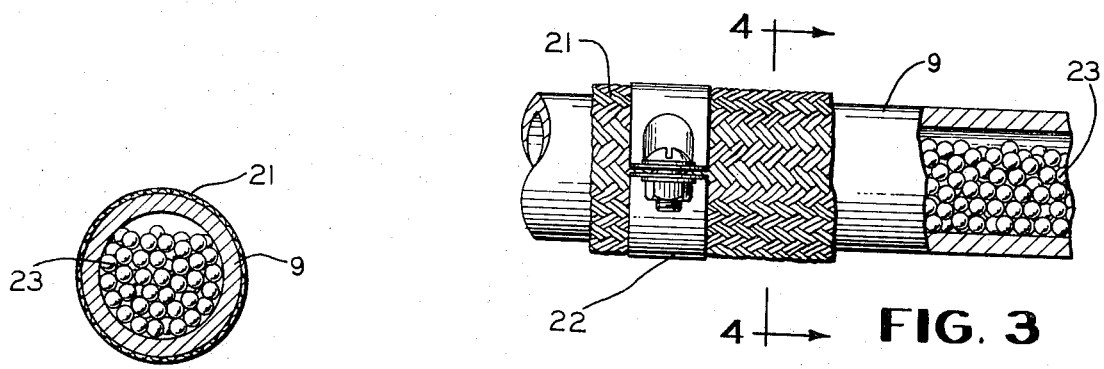
FIG. 3 is a fragmentary, elevation of a section of one of the rolls in accordance with the invention in the chilling area of FIG. 1, with part of the braided sleeve and roll wall broken away.
Figure 4:
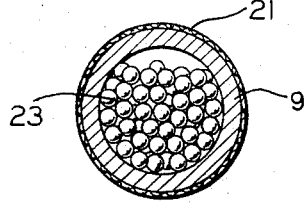
FIG. 4 is a sectional view taken substantially along the line 4—4 in FIG. 3.

Specifically, the invention was successfully practiced initially by employing, in the chilling area of a conventional tempering apparatus, tubular rolls such as shown in FIG. 2, and that were provided with fibrous protective and cushioning coverings 21 (FIGS. 3 and 4). These coverings were made up of pluralities of strands of wear resistant material, such as staple glass fibers, braided about a common axis to form radially expandible and contractible, soft, non-abrasive, resilient, tubular sleeves. While in radial expanded condition the sleeves were readily slipped over the rolls 9 and were subsequently brought into close contact therewith by extending the sleeves longitudinally to contract them against the rolls, after which they were secured thereto at opposite ends with suitable fastening means 22. Finally, the hollow interiors of the covered tubular rolls were charged to approximately 90 percent of their capacity with lead shot 23.

This procedure was very effective but it has developed from subsequent work that other materials, in different form and in varying amounts can also be used with some success. Thus, the dampening substance can be in solid or liquid as well as in particulate form; it may be loose in the roll or have its motion restricted; and it may take up varying proportions of the capacity of the roll over a rather wide range.

In fact, it is to be understood that the forms of the invention herewith shown and described are to be taken as preferred embodiments only of the same and that various changes in the shape size and arrangement of parts, as well as various procedural changes may be resorted to without departing from the spirit of the invention as defined in the following claims.

I claim:

1. In apparatus for tempering glass sheets, the combination; with means defining a horizontal path of travel through successive heating and chilling areas for said sheets, and means below said path in said chilling area for directing a cooling medium against said sheets; of a plurality of rotatable cylindrical rolls for supporting and moving said sheets through said chilling area, said rolls having a hollow interior, and a vibration dampening substance confined in the hollow interiors of said rolls and substantially but not completely filling same.

2. Apparatus as defined in claim 1 in which said cylindrical rolls are covered with a sleeve of refractory strands braided about a common axis.

3. Apparatus as defined in claim 1, in which said vibration dampening substance is particulate.

4. Apparatus as defined in claim 1 in which said substance is metallic.

5. Apparatus as defined in claim 4 in which said substance is lead shot.

6. Apparatus as defined in claim 5 in which said shot fills approximately 90 percent of the interior capacity of said rolls.

* * * * *

PO-1050
(5/69)

UNITED STATES PATENT OFFICE
CERTIFICATE OF CORRECTION

Patent No. 3,775,087  Dated  November 27, 1973

Inventor(s) George F. Ritter, Jr.

It is certified that error appears in the above-identified patent and that said Letters Patent are hereby corrected as shown below:

Col. 2, lines 28 & 29, after "of" cancel ", i.e., above and below"

Col. 2, line 30, after "of", first occurence, insert --, i.e., above and below--

Signed and sealed this 17th day of September 1974.

(SEAL)
Attest:

McCOY M. GIBSON JR.  C. MARSHALL DANN
Attesting Officer  Commissioner of Patents